(12) United States Patent
Dunham et al.

(10) Patent No.: US 6,240,862 B1
(45) Date of Patent: Jun. 5, 2001

(54) HOPPER SYSTEM WITH LID

(75) Inventors: Lisle J. Dunham, Downers Grove, IL (US); Alexander B. Ekrut, Bastorp, TX (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/570,192

(22) Filed: May 15, 2000

Related U.S. Application Data

(63) Continuation of application No. 09/060,833, filed on Apr. 15, 1998, now Pat. No. 6,065,410.

(51) Int. Cl.[7] .................................................... B67D 5/60

(52) U.S. Cl. ................................. 111/200; 222/609

(58) Field of Search ................................. 111/200, 925, 111/7.2; 239/663, 650; 222/129, 609, 608

(56) References Cited

U.S. PATENT DOCUMENTS

| | | |
|---|---|---|
| 2,097,062 | 10/1937 | Harris . |
| 2,870,615 | 1/1959 | Walk . |
| 3,362,143 | 1/1968 | Gullickson . |
| 3,982,670 | 9/1976 | Brass . |
| 4,359,952 | 11/1982 | Gesior et al. . |
| 4,485,939 | 12/1984 | Gafford et al. ........................ 222/129 |
| 4,541,549 | 9/1985 | Hadley et al. ........................ 222/143 |
| 4,547,177 | 10/1985 | Ueno ...................................... 464/69 |
| 4,601,372 | 7/1986 | Swales et al. ...................... 192/67 R |
| 4,715,515 | 12/1987 | Steilen ................................... 222/143 |
| 5,072,676 | 12/1991 | Pingry et al. ............................ 111/63 |
| 5,170,909 | 12/1992 | Lundie et al. ........................ 222/211 |
| 5,325,800 | 7/1994 | Wisor et al. ........................... 111/185 |
| 5,392,722 | 2/1995 | Snipes et al. ........................... 111/174 |
| 5,613,321 | 3/1997 | Rizkovsky ............................... 49/139 |
| 5,632,885 | 5/1997 | Yamasaki et al. ................... 210/96.1 |
| 5,655,468 | 8/1997 | Ledermann et al. .................... 11/164 |

FOREIGN PATENT DOCUMENTS

| | | |
|---|---|---|
| 0 140 260 | 5/1985 | (EP) . |
| 0 140 262 | 5/1985 | (EP) . |

OTHER PUBLICATIONS

Nodet Gougis Planter II Semoirs Monograines Polyvalents; 10 pages; undated.
WIC Precision Vacuum Planter Operator's Manual and Parts Book; 55 pages; 1994.
Stanhay Singulaire 785—The Precision Vacuum Seeder From Stanhay; 4 pages; undated.
Accord Precision Seed Drill *Optima* Operating Instructions—from serial No. 158; Art. No.: 758642/08.92; 55 pages.
MT 600; 34 pages; undated.
Monosem Pneumatic Planter Operator's Manual; NG Plus Mounted Planter; 60 pages; undated; presented by A.T.I., Inc. of Merriam, Kansas.

(List continued on next page.)

*Primary Examiner*—Christopher J. Novosad
(74) *Attorney, Agent, or Firm*—Foley & Lardner

(57) ABSTRACT

A hopper and lid system for an implement includes a hopper having a bottom and a plurality of walls forming an internal volume with a first opening through which the internal volume is filled and a second opening through which the internal volume is emptied, a lid configured to cover the opening, a first hook coupled to the lid and configured to engage one of the plurality of walls to support the lid relative to the hopper with the opening uncovered and a second hook coupled to the lid and configured to engage one of the plurality of walls to support the lid relative to the hopper with the opening uncovered. The second hook extends obliquely to the first hook. Preferably, the second hook extends perpendicular to the first hook to enable the lid to be coupled to perpendicular walls of the hopper. The hopper and lid system further includes a flexible tether having a first end coupled to the hopper and a second end coupled to the lid.

31 Claims, 5 Drawing Sheets

OTHER PUBLICATIONS

IS249 Kinze® Brush–type Seed Meter Installation, Operation and Maintenance; 4 pp.; Revised 8/92

Kinze®2000 Series Planters; 24 pages; Rev. 8–93.

White 6200/6300 Series Planters; Ultimate Flexibility; 4 pages; 1995 AGCO Corporation, Duluth, Georgia.

White 6000 Series Planters; Managing for Profit; 24 pages; Form No. LT93PL035 1993.

Dickey–john High Rate Seed Sensors; 1 page; undated.

Planter Attachments for MaxEmerge®Plus, MaxEmerge2®, and MaxEmerge® Planters; 24 pages; DKA139; undated.

Advantage 1780 New Planter . . . New Sales Advantages; 8 pages; DKB506; undated.

MaxEmerge®Plus Planters; 40 pages; undated.

Monosem, The Precision Vacuum Planter; NG Plus Series; Mounted & Pull–Type; The New Generation of Planters; 12 pages; undated; presented by A.T.I., Inc. of Merriam, Kansas.

White 6800 Series Central Fill; Narrow Row Planting System; 2 pages; 1995.

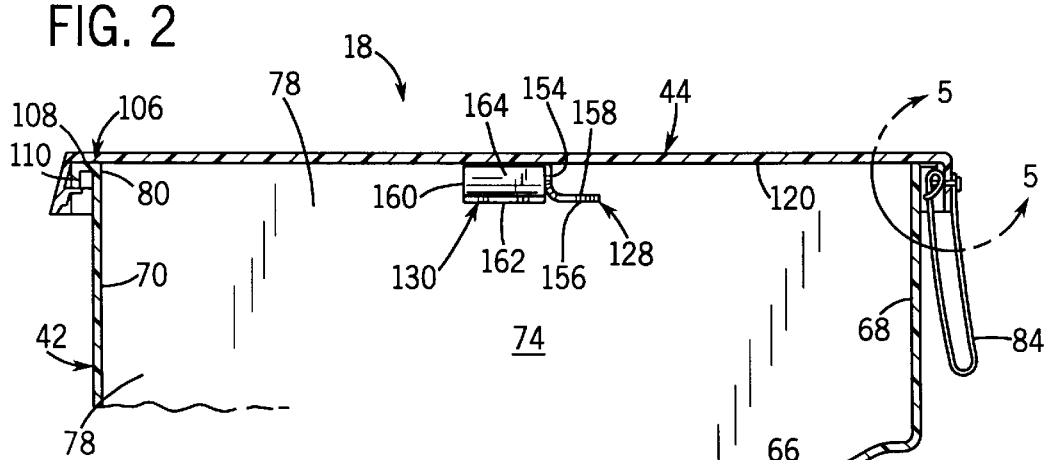
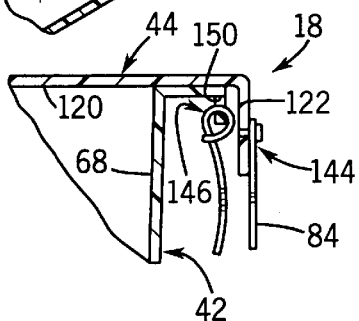
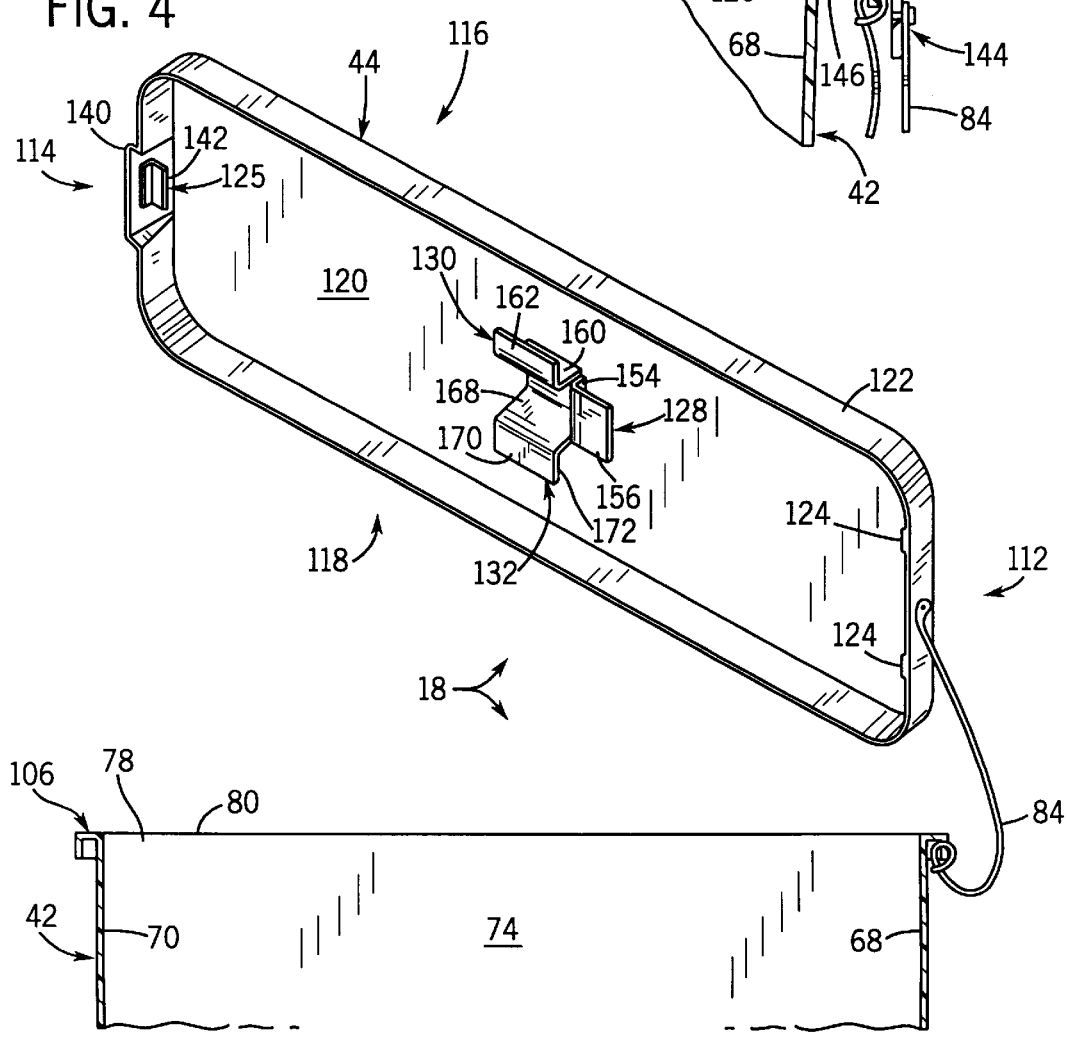

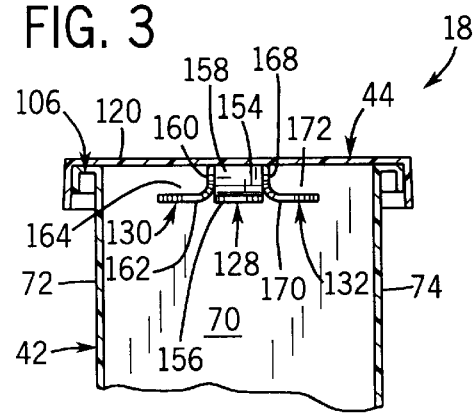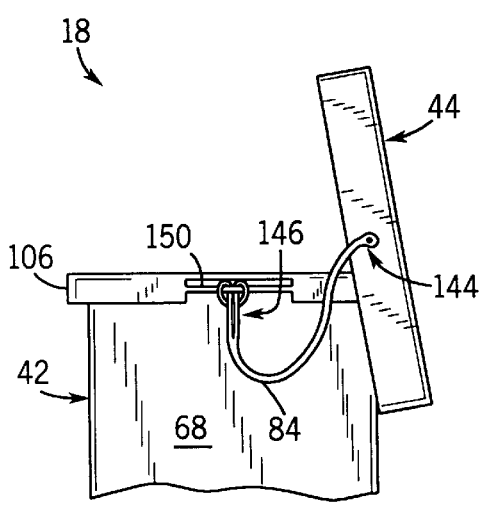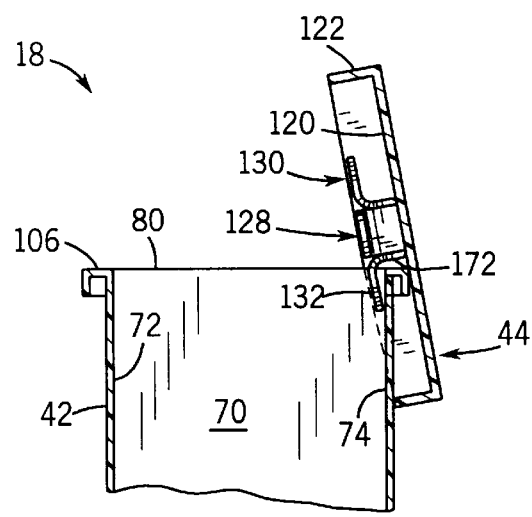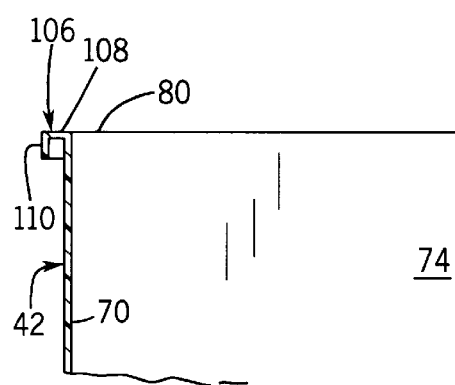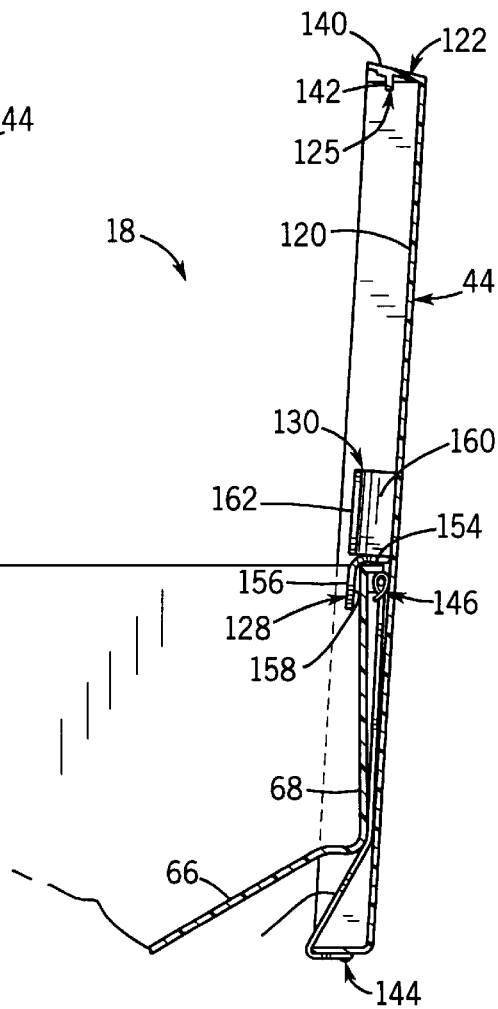

HOPPER SYSTEM WITH LID

CROSS-REFERENCE TO RELATED APPLICATIONS

This continuation application claims priority under 35 U.S.C. §120 from U.S. patent application Ser. No. 09/060,833 filed on Apr. 15, 1998 and entitled HOPPER SYSTEM WITH LID, now U.S. Pat. No. 6,065,410 the full disclosure of which is hereby incorporated by reference.

FIELD OF THE INVENTION

The present invention relates to implement hoppers for storing and dispensing materials such as seed, fertilizers, insecticide and herbicide. In particular, the present invention relates to a lid for an implement hopper that is easily and securely mounted to the hopper while the hopper is being filled with material.

BACKGROUND OF THE INVENTION

Various vehicles and implements, such as planters, include hoppers for storing and dispensing materials such as seed, fertilizers, insecticides and herbicides. Hoppers typically include a first opening through which the internal volume of the hopper is filled and a second opening through which the material stored within the hopper is dispensed or metered. Although hoppers may have various sizes and shapes, conventional hoppers are generally elongate in shape to increase the number of hoppers that may be carried by the vehicle or implement along its transverse width. Reducing the width of each hopper to increase the number of hoppers which may be supported along the width of the vehicle or implement is extremely important in many implements, such as planters, where the implement must carry multiple hoppers for planting or applying materials, such as seeds and the like, to multiple rows narrowly spaced from one another.

To prevent contamination of the materials stored within the hopper and to enable the hopper to be filled or emptied, hoppers typically include a lid configured to temporarily cover and seal the first opening. During filling of the hopper, the lid is typically supported by the hopper adjacent the hopper with the opening uncovered. To enable the lid to be supported adjacent to the hopper with the opening uncovered, the lids are typically hinged to the hopper or are temporarily hooked to the hopper. Hinged lids typically include one or more elongate hinges interconnecting the lid to one of the hopper side walls. Hooked lids typically include a single hook which extends from a lower surface of the lid and which forms a channel sized to receive the front wall of the hopper.

Both conventional arrangements for mounting the lid to the hopper during filling have several disadvantages. Current arrangements using hinges increase both the cost and manufacturing complexity of the hopper and lid. Moreover, arrangements using hinges generally require that the hopper and the lid be stronger and more rigid at locations where the hinge is fastened to the hopper and to the lid.

Current arrangements using a single hook extending from the bottom of the lid frequently allow the lid to be accidentally separated from the hopper during filling such as during periods of high wind. With both arrangements, the lid can only be secured to the hopper along one predetermined side. As a result, neither of the conventional arrangements enable the person filling the hopper to easily adjust the positioning of the lid to facilitate filling of the hopper.

Thus, there is a continuing need for a hopper and lid system that enables the lid and hopper to be formed from relatively thin and inexpensive materials, that enables the positioning of the lid to be easily modified to facilitate filling of the hopper and that securely retains the lid to the hopper during high winds.

SUMMARY OF THE INVENTION

The present invention is directed to a lid for use with a hopper having a bottom and a plurality of walls forming an internal volume having a first opening through which the internal volume is filled and a second opening through which the internal volume is emptied. The lid includes a panel configured to cover the opening and first and second hooks. Each hook is configured to engage one of the side walls to support the panel relative to the hopper with the opening uncovered. The second hook extends obliquely to the first hook.

The present invention is also directed to a hopper and lid system for an implement that includes a hopper having a bottom and a plurality of walls forming an internal volume with a first opening through which the internal volume is filled and a second opening through which the internal volume is emptied, a lid configured to cover the opening, a first hook coupled to the lid and configured to engage one of the plurality of walls to support the lid relative to the hopper with the opening uncovered and a second hook coupled to the lid and configured to engage one of the plurality of walls to support the lid relative to the hopper with the opening uncovered. The second hook extends non parallel to the first hook. Preferably, the second hook extends perpendicular to the first hook to enable the lid to be coupled to perpendicular walls of the hopper. The hopper and lid system further includes a flexible tether having a first end coupled to the hopper and a second end coupled to the lid.

The present invention is also directed to a hopper and lid system for an implement, the hopper and lid system comprising a hopper having a bottom and a plurality of walls forming an internal volume with a first opening through which the internal volume is filled and a second opening through which the internal volume is emptied, a lid configured to cover the opening and a flexible tether having a first end coupled to the hopper and a second end coupled to the lid.

BRIEF DESCRIPTION OF THE DRAWINGS

FIG. 2 is a sectional view of the hopper system of FIG. 1 with the lid closing an opening of the hopper.

FIG. 3 is a sectional view of the hopper system illustrating the lid covering the opening of the hopper.

FIG. 4 is a perspective view of the lid removed from the hopper which is shown in section.

FIG. 5 is a fragmentary sectional view of the hopper system of FIG. 2 taken along lines 5—5.

FIG. 6 is a sectional view of the hopper system of FIG. 1 illustrating the lid supported adjacent to the rear wall of the hopper with the opening uncovered.

FIG. 7 is a side elevational view of the lid supported adjacent to a side wall of the hopper with the opening of the hopper uncovered.

FIG. 8 is a sectional view of the lid supported adjacent to the side wall of the hopper with the opening of the hopper uncovered.

DETAILED DESCRIPTION OF THE PREFERRED EMBODIMENT

Figure 1:
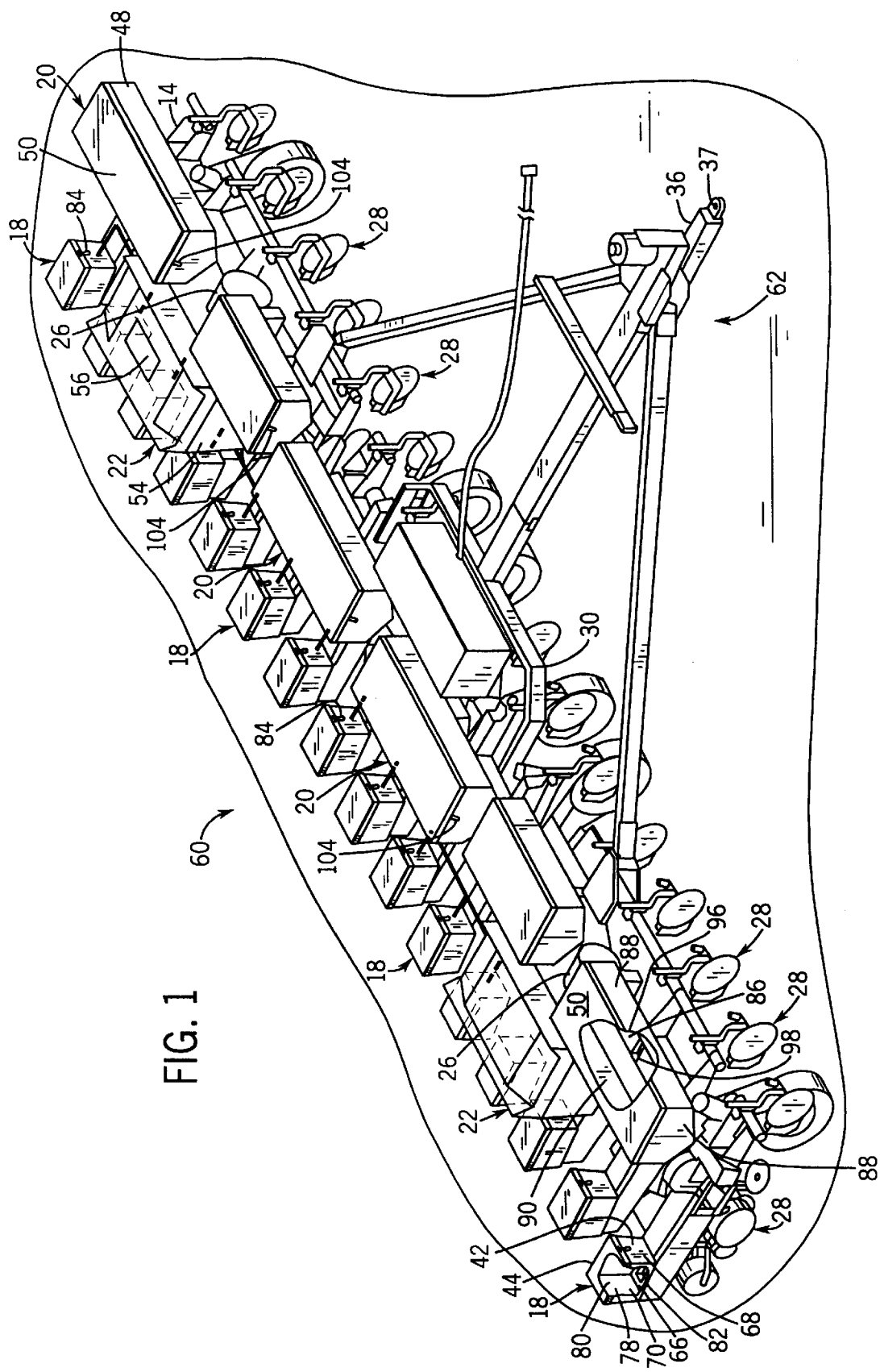
FIG. 1 is a perspective view of an implement including a hopper system having a hopper and a lid of the present invention.

FIG. 1 is a perspective view of an implement 10. Implement 10 preferably comprises a planter adapted to be pulled behind a vehicle. Implement 10 generally includes a support structure such as a frame 14, hopper systems 18, 20 and 22, metering modules 26 and row units 28. Frame 14 includes a main section 30 and draw bar 36 extending forward from section 30. Draw bar 36 includes a hitch 37 configured for being attached to a vehicle (not shown). Overall, frame 14 supports and carries hopper systems 18, 20 and 22, metering modules 26 and row units 28. As can be appreciated, frame 14 may have a variety of different sizes, shapes and configurations depending upon the number of row units being supported, the type of vehicle pulling implement 10, the method by which by frame 14 is mounted to a vehicle, and the size, configuration and number of hopper systems and metering modules supported by frame 14.

Hopper systems 18, 20 and 22 are supported by frame 14 and are configured for storing and dispensing materials, such as seed, fertilizers, insecticides and herbicides. In the exemplary embodiment illustrated, hopper systems 18 are configured for storing and dispensing herbicide or insecticide while hopper systems 20 and 22 are configured for storing and dispensing other materials, such as fertilizer and seed, respectively. Each of hopper systems 18, 20 and 22 includes a hopper and a lid. In particular, hopper systems 18 include hopper 42 and lid 44; hopper systems 20 include hoppers 48 and lids 50; and hopper systems 22 include hoppers 54 and lids 56. Hoppers 42 are supported by frame 14 generally above each row unit 28 and longitudinally extend from rear 60 of implement 10 towards front 62 of implement 10. Hoppers 42 preferably have a longitudinal length greater than a transverse width such that the greater number of hoppers 42 may be supported along the width of frame 14 to accommodate narrower spacings between row units 28. Each hopper 42 generally includes a bottom 66, a front wall 68, a rear wall 70 and a pair of opposing side walls 72, 74. Bottom 66, front wall 68, rear wall 70 and side wall 72, 74 define an internal volume 78 which has a first opening 80 through which internal volume 78 is filled with material and a second opening 82 through which material is emptied or dispensed from internal volume 78. Opening 80 is preferably located at an upper end of each hopper 18 opposite bottom 66 while opening 82 preferably extends through bottom 66 opposite opening 80. Material dispensed from hoppers 42 through openings 82 is further directed and metered to at least one corresponding row unit 28 in a conventionally known manner.

Lids 44 of hopper 42 are generally configured to cover and seal about openings 80 of hoppers 42 to prevent moisture and other contaminants from entering internal volume 78. At the same time, lids 44 are also configured for being releasibly attached to hoppers 42 to enable lids 44 to be removed and displaced from over opening 80 to permit internal volume 78 of hoppers 42 to be filled with material. During filling, lids 44 are hooked to hoppers 42 to one side of opening 80. In addition, lids 42 are also secured to hoppers 42 by flexible tethers 84. As a result, should lids 44 become unhooked from hoppers 42, tethers 84 prevent lids 44 from falling to the ground or otherwise blowing away.

Hopper systems 20 are substantially similar to hopper systems 18 except that hopper systems 20 are substantially larger than hopper systems 18 and longitudinally extend between sides of implement 10. Similar to hoppers 42 of hopper systems 18, hoppers 48 of hopper systems 20 include a bottom 86 and a plurality of walls 88 which define an internal volume 90 having an upper opening 96 through which material is loaded into hopper 48 and a lower opening 100 through which material within the internal volume 90 is dispensed from hopper 48. Material within hoppers 48 is preferably dispensed to multiple corresponding row units 28 in a conventionally known manner. Lids 50 of systems 20 are also substantially similar to lids 44 of systems 18. Lids 50 are generally configured to cover and seal upper opening 96 of hoppers 48. Lids 50 are also configured to be hooked to hoppers 48 during filling of hoppers 48 and are additionally attached to hoppers 48 by tethers 104.

Hopper systems 22 include generally larger hoppers 54 and lids 56 to retain larger quantities of materials such as seed. In contrast to hopper systems 18 and 20, hopper systems 22 include lids 56 which are hinged to hoppers 54. In the exemplary embodiment illustrated, hopper systems 22 dispense material, such as seed, to metering modules 26 which meter the material to row units 28 in a conventionally known manner.

Row units 28 are conventionally known and are mounted to the underside of frame 14. Row units 28 receive metered materials from hopper systems 18, 20 and 22 and place the material either below or above the soil in rows during planting.

FIGS. 2–8 illustrate hopper 42, lid 44 and tether 84 of a hopper system 18 in greater detail. As best shown by FIGS. 2 and 3, front wall 68 and rear wall 70 have a first transverse width while side walls 72 and 74 have a second greater longitudinal length. Each of front wall 68, rear wall 70 and side walls 72, 74 terminate in a rim 106 about opening 80. Rim 106 includes a horizontally projecting flange 108 and a downwardly projecting flange 110. Rim 106 rigidifies and strengthens hopper 42 about opening 80. Rim 106 further provides a structure about which lid 44 may be releasibly latched.

As best shown by FIG. 4, lid 44 has a front 112, a rear 114 and opposite sides 116, 118. Lid 44 covers opening 80 and generally includes panel 120, rim 122, latch members 124, 125 and hooks 128, 130 and 132. Panel 120 is generally configured to span opening 80 from front wall 68 to rear wall 70 and from side wall 72 to side wall 74. Accordingly, panel 120 preferably has a transverse width and a greater longitudinal length.

Rim 122 obliquely extends from panel 120 about a perimeter of panel 120. Rim 122 is preferably integrally formed with panel 120. Rim 122 extends adjacent to and below rim 106 of hopper 42 to seal panel 120 over opening 80.

Latch members 125 comprise flexible tabs which inwardly project from a lower edge of rim 122 at front 112 towards rear 114 of lid 44. Latch members 124 preferably project inward away from rim 122 a sufficient distance so as to extend below flange 110 of rim 106 to releasibly secure front 112 of lid 44 to rim 106 of front wall 68 when lid 44 is positioned over opening 80.

Latch member 98 comprises an outwardly extending handle portion 140 and an inwardly extending tab 142. Handle portion 140 is preferably integrally formed as part of rim 122 and extends outwardly away from front 112 a distance sufficient for enabling the operator's fingers to grasp handle portion 140. Handle portion 140 is preferably thin and resiliently flexible.

Tab 142 projects from an inner surface of handle portion 140 towards the front 112. As best shown by FIG. 2, tab 142 generally projects a sufficient distance so as to extend below and engage a lower edge of flange 110. As a result, tab 142 releasibly secures rear 114 of lid 44 to rear wall 70 of hopper 42. Because handle portion 140 is preferably made from a resiliently deformable material, handle portion 140 may be deformed outwardly to move tab 142 away from flange 110 to rear 114 of lid 44 to be lifted away from hopper 42. Consequently, lid 44 may be lifted and removed from hopper 42 for enabling the operator to inspect interior volume 78 of hopper 42 or for enabling the operator to fill the interior volume 78 of hopper 42 through opening 80.

FIGS. 4 and 5 illustrate tether 84 in greater detail. Referring to FIG. 5, tether 84 is made of a flexible material and has a first end 144 affixed to lid 44 and a second end 146 affixed to hopper 42. In the embodiment illustrated, end 144 is fastened to flange 110 of rim 122 at front 112 of lid 44. End 146 is fastened to flange 110 of rim 106 adjacent front wall 68 of hopper 42. In the preferred embodiment illustrated, end 144 is riveted to rim 122 while end 146 is slitted so as to be looped through itself and through bore 150 of flange 110. Tether 84 secures lid 44 to hopper 42 when lid 44 is positioned so as to cover opening 80 and also when lid 44 is lifted away from opening 80.

FIGS. 2, 3 and 4 illustrate hooks 128, 130 and 132. Hook 128 extends from a lower surface of panel 120 along a longitudinal centerline of lid 44. Hook 128 is also preferably located proximate a transverse midpoint of lid 44. Hook 128 includes a first portion 154 which obliquely extends from panel 120 and a second portion 156 which obliquely extends from portion 154 and is spaced from panel 120 so as to form a channel 158 between panel 120 and portion 156 adjacent portion 154. Channel 158 extends from portion 154 towards front 112 of lid 44. Channel 158 is sized and configured for receiving and capturing front wall 68 and the adjacent portion of rim 106.

Hook 130 extends from a lower surface of panel 120 and is centered along the transverse centerline of lid 44. Hook 130 is also preferably located proximate a longitudinal midpoint of lid 44. Hook 130 extends non parellel to hook 128 and includes first portion 160 and second portion 162. First portion 160 obliquely extends from the lower surface of panel 120 while second portion 162 obliquely extends from first portion 160 at a location spaced from panel 120. First portion 160 and second portion 162 of hook 130 define a channel 134 between panel 120 and second portion 162 and adjacent to first portion 160. Channel 134 projects from first portion 160 towards side 116 of lid 44. Channel 134 is preferably sized and configured for receiving and capturing side wall 72 and the adjacent portion of rim 106 of hopper 42.

Hook 132 is substantially identical to hook 130 except that hook 132 extends non parellel from hook 128 towards side 118 of lid 44. As with hook 130, hook 132 extends along the transverse centerline of lid 44 proximate a longitudinal midpoint of lid 44. Hook 132 includes first portion 168 and second portion 170. First portion 168 obliquely extends from panel 120 while second portion 140 obliquely extends from first portion 168 at a location spaced from panel 120. As a result, first portion 168 and second portion 170 define a channel 172 between panel 120 and second portion 140 adjacent first portion 168. Channel 172 extends from first portion 168 towards side 118 of lid 44. Channel 172 is sized and configured to receive and capture side wall 74 and the adjacent portion of rim 106.

In the preferred embodiment illustrated, hooks 128, 130 and 132 are integrally formed as a single unitary body with one another and are fastened to the lower surface of panel 120. Hooks 128, 130 and 132 are preferably formed from a single piece of a T-shaped metal sheet with the deformed ends which is heat-staked to panel 120. As a result of this configuration, hooks 128, 130 and 132 are easily manufactured and are easily fastened to panel 120. Moreover, this construction also enables existing lids 44 to be easily modified to include hooks 128, 130 and 132. Alternatively, hooks 128, 130 and 132 may be individually formed and individually mounted to panel 120. Moreover, hooks 128, 130 and 132 may alternatively be integrally formed as part of a single unitary body with panel 92. Hooks 128, 130 and 132 are preferably dimensioned and made of materials so as to enable hooks 128, 130 and 132 to rigidly support lid 44 adjacent to hopper 42 while internal volume 78 of hopper 42 is being filled with material through opening 80. Although hooks 128, 130 and 132 are configured to catch directly upon walls of hopper 42 such that the walls can be formed from less rigid, thinner and less expensive materials, hooks 128, 130 and 132 may alternatively be configured for engaging corresponding hooks or rings attached at selected locations to the walls of hopper 42. As it will be further understood, hooks 128, 130 and 132 may have a variety of different sizes, shapes and configurations and may be formed from a variety of different materials.

FIGS. 6–8 illustrate hooks 128 and 132 removably supporting lid 44 adjacent hopper 42 in various positions while opening 80 is uncovered. FIGS. 5 and 6 also illustrate tether 84 additionally coupling lid 44 to hopper 42 in each of the lid positions shown. Referring to FIG. 6, hook 128 engages front wall 68 of hopper 42 to capture front wall 68 and rim 106 within channel 158. As a result, hook 128 supports lid 44 adjacent to opening 80 and parallel to front wall 68 while interior volume 78 of hopper 42 is being inspected or filled with material. Because hook 128 extends along the longitudinal centerline of lid 42 and because hook 128 is further positioned proximate the transverse midpoint of lid 44, front wall 68 of hopper 42 nests adjacent to panel 92 within rim 106. Consequently, hook 128 more stably secures lid 44 to hopper 42.

As shown by FIGS. 7 and 8, hook 132 engages side wall 74 to capture side wall 74 and rim 106 within channel 172 between panel 92 and second portion 170. Because hook 132 extends along the transverse centerline of lid 44 proximate a longitudinal midpoint of lid 44 and because hook 132 is spaced front panel 92 a distance less than the length of rim 122, hook 132 causes side wall 74 to be partially nested adjacent to panel 92 and within rim 122. Consequently, lid 44 is more securely supported adjacent to opening 80 of hopper 42.

Because hooks 128, 130 and 132 extend from panel 92, the forces exerted upon hooks 128, 130 and 132 are distributed across substantially the entire face of panel 92. As a result, lid 44 may be formed from a thinner, less expensive material, such as a thin thermoplastic. Likewise, because hooks 128, 130 and 132 receive a substantial portion of walls 68, 74 and 72, respectively, and are cantilevered against such walls, the forces exerted by lid 44 against the walls is dispensed across the entire length of the wall. As a result, hooks 128, 130 and 132 also enable walls 68, 70, 72 and 74 of hopper 42 to also be made of a less rigid, thinner and less expensive material, such as a thermoplastic.

Because hook 132 and channel 172 extend generally non parellel to hook 128 and channel 158, hook 132 enables lid 44 to alternatively be releasibly coupled to side wall 74 adjacent hopper opening 80. Although not specifically illustrated, hook 130 also functions similar to hook 132 except that hook 130 enables lid 44 to alternatively be releasibly mounted to side wall 72 adjacent opening 80 during inspection of internal volume 78 or during filling of internal volume 78 with material. As a result, hooks 128, 130 and 132 enable lid 44 to be releasibly coupled to any of rear wall 68, side wall 72 or side wall 74. This versatility enables the operator to support lid 44 relative to hopper 42 at any one of a variety of desired positions to simplify inspection or filling of internal volume 78. For example, if the operator is positioned on either side of hopper 42 or if the material used to fill internal volume 78 is on either side of hopper 42, the operator may simply hook lid 44 to the opposite side wall 72 or 74. If the operator or the material is located directly behind hopper 42, lid 44 may be hooked to rear wall 68 of hopper 42. In addition to simplifying the inspection or filling of internal volume 78, hooks 128, 130 and 132 also enable lid 44 to be more appropriately hooked to hopper 42 to withstand wind from various directions. For example, if the wind is blowing from front wall 70 towards rear wall 68, hook 128 enables lid 44 to be hooked to rear wall 68 to better withstand the wind. Alternatively, if the wind is blowing from side wall 72 towards side wall 74, or vis-versa, hooks 130 and 132 enable lid 44 to be hooked to either of side walls 72, 74 to better withstand the wind.

As best shown by FIGS. 6 and 7, tether 84 serves as an additional safeguard against lid 44 blowing away or becoming separated from hopper 42. Because tether 84 is flexible and has a sufficient length for enabling lid 44 to be hooked to any of walls 68, 72 or 74, tether 84 further facilitates the repositioning of lid 44 to meet changing conditions. Because tether 84 is flexible, tether 84 also does not interfere with the ability of walls 68, 72 or 74 to partially nest within lid 44 while lid 44 is supported adjacent to one side of opening 80.

Figure 9:
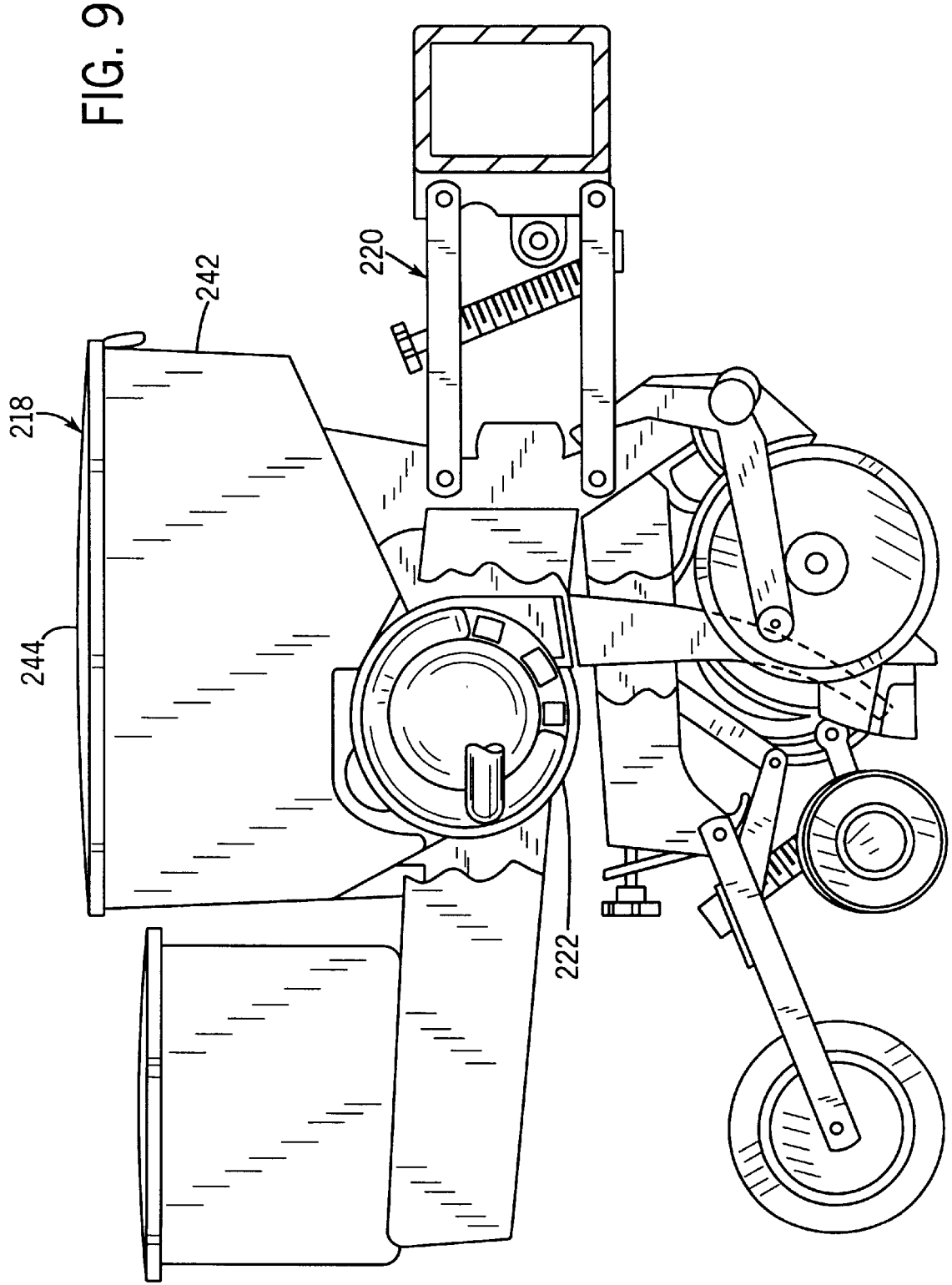
FIG. 9 is a side elevational view of a second embodiment of the hopper system shown in FIGS. 1–8 utilized on a plate planter.

FIGS. 9–12 illustrate hopper system 218, an alternate embodiment of hopper system 18, shown in FIGS. 1–8. Hopper system 218 is illustrated in conjunction with plate planter 220 which is described and illustrated in co-pending U.S. patent application Ser. No. 09/061,639 entitled "Seed Metering System with Improved Wear Enhancement" filed on the same date herewith, the full disclosure of which is hereby incorporated by reference, and U.S. patent application Ser. No. 08/700,222 filed on Aug. 20, 1996, the full disclosure of which is also hereby incorporated by reference. As shown by FIG. 9, hopper system 218 generally includes hopper 242 and lid 244. Hopper 242 is substantially identical to hopper 42 except that hopper 242 dispenses material to seed meter 222.

Figure 10:
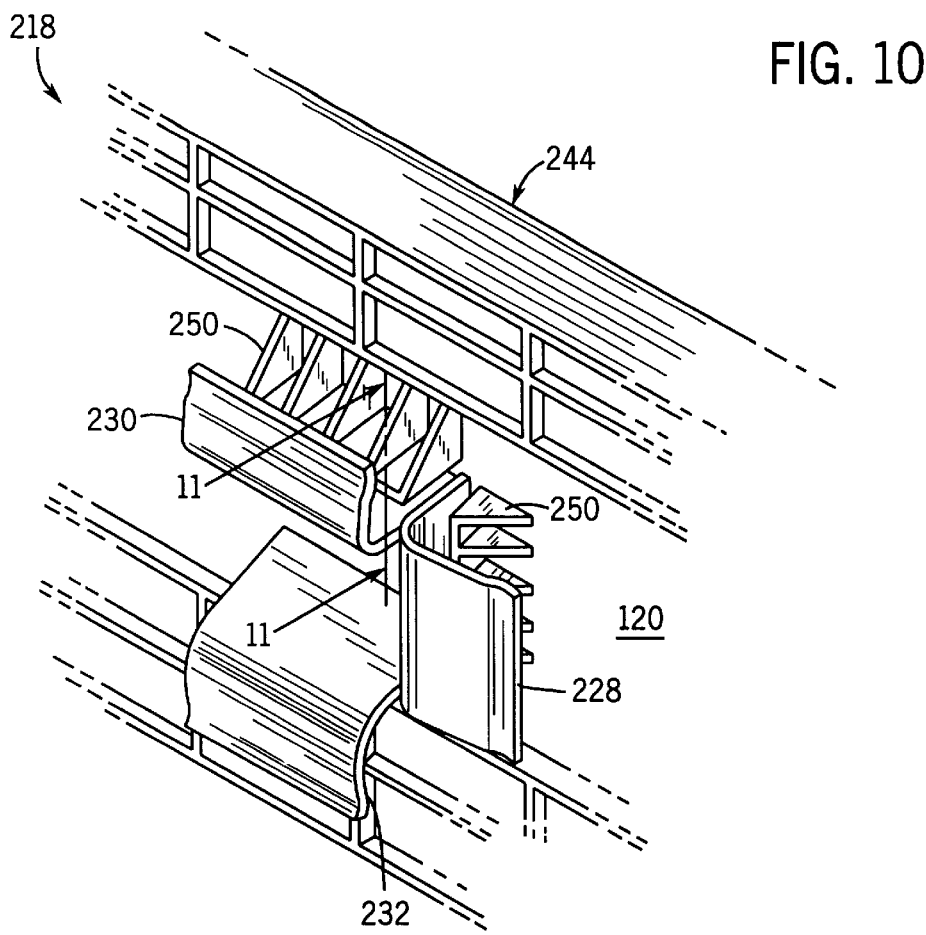
FIG. 10 is a fragmentary perspective view of a lid of the hopper system of FIG. 9.
Figure 12:
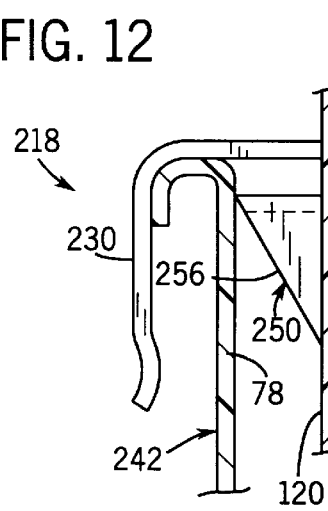
FIG. 12 is a sectional view of the lid of FIG. 10 mounted to a side wall of a hopper of the hopper system shown in FIG. 9.
Figure 11:
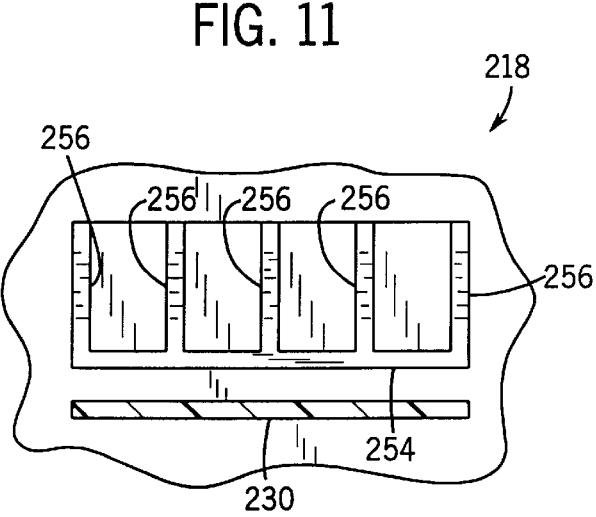
FIG. 11 is a sectional view of the lid of FIG. 10 taken along lines 11—11.

As best shown by FIGS. 10–12, lid 244 is similar to lid 44 except that lid 244 additionally includes ramps 250 proximate each of hooks 228, 230 and 232. Hooks 228, 230 and 232 are substantially identical to hooks 128, 130 and 132, respectively, except that hook 228 is more closely spaced to panel 120 of lid 244. Because hook 228 is more closely spaced to panel 120, lid 244 more securely nests against side wall 68 (shown in FIG. 2).

Ramps 250 extend away from panel 120 and slope towards an adjacent hook 228, 230 or 232. As shown by FIG. 11, each ramp 250 generally includes a front wall 254 and a plurality of triangular shaped legs 256. Wall 254 and legs 256 are preferably integrally formed as a single unitary body which is welded to panel 120. Alternatively, ramps 250 may be integrally formed with panel 120 or may be mounted to panel 120 by various other attachment mechanisms. As shown by FIG. 12, ramps 250 have a height such that each ramp 250 pinches upper side wall 78 between the adjacent hook 230 and ramp 250. As a result, ramps 250 more securely retain lid 244 adjacent hopper 242. Ramps 250 also enable lid 244 to be supported in a parallel relationship to the side walls of hopper 242.

Although the present invention has been described with reference to preferred embodiments, workers skilled in the art will recognize that changes may be made in form and detail without departing from the spirit and scope of the invention. The present invention described with reference to the preferred embodiments and set forth in the following claims is manifestly intended to be as broad as possible. For example, unless specifically otherwise noted, the claims reciting a single particular element also encompass a plurality of such particular elements.

What is claimed is:

1. A lid for use with an implement hopper having a bottom and a plurality of walls forming an internal volume that has a first opening through which the internal volume is filled with material and a second opening through which material is emptied from the internal volume, the lid comprising:

a panel configured to cover the first opening;

a first hook extending from the panel and configured to engage one of the walls to support the lid relative to the hopper with the opening uncovered, the first hook defining a first channel extending in a first general direction; and a second hook coupled to the panel and defining a second channel extending in a second general direction nonparallel to the first hook, wherein the second hook is configured to engage one of the walls to support the lid relative to the hopper with the first opening uncovered.

2. The lid of claim 1 including a third hook coupled to the panel, wherein the third hook is configured to engage one of the walls to support the lid relative to the hopper with the first opening uncovered.

3. The lid of claim 1 wherein the plurality of walls includes:

first and second opposing walls having a first width and a third and fourth opposing walls having a first length greater than the first width, wherein the panel has a second width and a second length greater than the second width and wherein the second hook is configured to engage one of the third and fourth opposing walls to support the panel such that the second length of the panel extends substantially parallel to the first length of the third and fourth opposing walls.

4. The lid of claim 1 wherein the panel has a longitudinal length and a transverse width and wherein the first hook extends along a longitudinal center line of the panel.

5. The lid of claim 1 wherein the panel has a longitudinal length and a transverse width and wherein the second hook extends along a transverse center line of the panel.

6. The lid of claim 1 wherein the panel has a longitudinal length and a transverse width, wherein the first hook extends along a longitudinal center line of the panel and wherein the second hook extends along a transverse center line of the panel.

7. The lid of claim 1 wherein the panel has a bottom face adapted to face the hopper and wherein the first and second hooks extend from the face.

8. The lid of claim 1 including at least one latch adapted to engage at least one of the walls of the hopper to releasably secure the lid to the hopper with the lid covering the opening.

9. The lid of claim 1 including a ramp having a ramp surface extending away from the panel and sloping towards the first hook.

10. The lid of claim 9, wherein the ramp surface is integrally formed as part of a single unitary body with the panel.

11. The lid of claim 9, wherein the ramp has a height so as to pinch said one of the walls against the first hook.

12. The lid of claim 9, wherein the ramp and the first hook simultaneously engage said one of the walls and cooperate with one another to support the lid in a parallel relationship to said one of the walls.

13. The lid of claim 9, wherein the ramp is generally triangular shaped.

14. The lid of claim 9, wherein the ramp includes a front wall and a plurality of triangular shaped legs.

15. A lid for use with an implement hopper having a bottom, a front wall, a rear wall, and opposing side walls forming an internal volume having a first opening through which the internal volume is filled and a second opening through which the internal volume is emptied, the lid comprising:

a panel configured for covering the first opening, wherein the panel has a front end, a rear end and opposing sides and wherein the front end, the rear end and the opposing sides extend parallel to the front wall, the rear wall and the opposing side walls, respectively, of the hopper when the panel covers the first opening; and a first hook extending from the panel and configured to engage one of the walls to support the panel relative to the hopper with the first opening uncovered such that the opposing sides of the panel extend adjacent to one of the opposing side walls of the hopper wherein the first hook defines a first channel configured to receive said one of the walls and wherein the lid additionally includes a second hook extending from the panel and defining a second channel extending in a second general direction non-parallel to the first hook, wherein the second hook is configured to engage one of the walls to support the lid relative to the hopper with the first opening uncovered.

16. The lid of claim 15, including a third hook coupled to the panel, wherein the third hook is configured to engage one of the walls to support the lid relative to the hopper with the first opening uncovered.

17. The lid of claim 15, wherein the panel has a longitudinal length and a transverse width and wherein the first hook extends along a longitudinal center line of the panel.

18. The lid of claim 15, wherein the panel has a longitudinal length and a transverse width and wherein the second hook extends along a transverse center line of the panel.

19. The lid of claim 15, wherein the panel has a longitudinal length and a transverse width, wherein the first hook extends along a longitudinal center line of the panel and wherein the second hook extends along a transverse center line of the panel.

20. The lid of claim 15, wherein the panel has a bottom face adapted to face the hopper and wherein the first and second hooks extend from the face.

21. The lid of claim 15, including at least one latch adapted to engage at least one of the walls of the hopper to releasably secure the lid to the hopper with the lid covering the first opening.

22. The lid of claim 15, wherein the front wall and the rear wall have a first width, wherein the opposing side walls have a first length greater than the first width, wherein the panel has a second width and a second length greater than the second width and wherein the second hook is configured to engage one of the opposing side walls to support the panel such that the second length of the panel extends substantially parallel to the first length of the opposing side walls.

23. The lid of claim 15 including a ramp having a ramp surface extending away from the panel and sloping towards the first hook.

24. The lid of claim 23, wherein the ramp surface is integrally formed as part of a single unitary body with the panel.

25. The lid of claim 23, wherein the ramp has a height so as to pinch said one of the walls against the first hook.

26. The lid of claim 23, wherein the ramp and the first hook simultaneously engage said one of the walls and cooperate with one another to support the lid in a parallel relationship to said one of the walls.

27. The lid of claim 23, wherein the ramp is generally triangular shaped.

28. The lid of claim 27, wherein the ramp includes a front wall and a plurality of triangular shaped legs.

29. A lid for use with an implement hopper having a bottom and a plurality of walls forming an internal volume that has a first opening through which the internal volume is filled with material and a second opening through which material is emptied from the internal volume, the lid comprising:

a panel configured to cover the first opening;

a first hook extending from the panel and configured to engage one of the walls to support the lid relative to the hopper with the opening uncovered; and a ramp proximate the first hook and having a ramp surface extending from the panel towards the first hook, wherein the ramp surface is configured to engage a said one of the walls to assist in supporting the lid relative to the hopper with the first opening uncovered.

30. The lid of claim 29 including a second hook coupled to the panel and defining a second channel extending non-parallel to the first hook, wherein the second hook is configured to engage one of the walls to support the lid relative to the hopper with the first opening uncovered.

31. The lids of claim 30 including a second ramp proximate to the second hook and having a second ramp surface extending towards the second hook, wherein the second ramp surface is configured to engage said one of the walls to assist in supporting the lid relative to the hopper with the first opening uncovered.

* * * * *